United States Patent
Argabright et al.

[15] 3,705,627
[45] Dec. 12, 1972

[54] INHIBITION OF SALINE WATER INTRUSION INTO FRESH WATER AQUIFERS

[72] Inventors: Perry A. Argabright, Sedalia; Jack L. Hummel; C. T. Presley, both of Littleton, all of Colo.

[73] Assignee: Marathon Oil Company, Findlay, Ohio

[22] Filed: Feb. 1, 1971

[21] Appl. No.: 111,422

[52] U.S. Cl. ............................ 166/295, 166/270
[51] Int. Cl. ............................................ E21b 33/138
[58] Field of Search .............. 166/295, 300, 270, 294

[56] References Cited

UNITED STATES PATENTS

| | | |
|---|---|---|
| 3,400,761 | 9/1968 | Latimer, Jr. et al. ................. 166/294 |
| 3,614,985 | 10/1971 | Richardson ........................... 166/294 |
| 3,195,630 | 7/1965 | Fisher .................................. 166/292 |
| 3,587,737 | 6/1971 | Tosch .................................. 166/294 |
| 3,380,522 | 4/1968 | Payne, Jr. et al. ..................... 166/268 |
| 2,272,672 | 2/1942 | Kennedy .............................. 166/270 |
| 2,747,670 | 5/1956 | King et al. ........................... 166/270 |
| 2,903,065 | 9/1959 | Holbrook et al. ..................... 166/272 |
| 3,396,790 | 8/1968 | Eaton ................................... 166/270 |
| 3,490,533 | 1/1970 | McLaughlin ......................... 166/270 |

*Primary Examiner*—Stephen J. Novosad
*Attorney*—Joseph C. Herring and Richard C. Willson

[57] ABSTRACT

Solutions of soluble compounds, e.g., aqueous alkaline solutions of substituted isocyanuric acids, are injected into an intruding front of saline water to form an insoluble precipitate, thus decreasing formation permeability and reducing or eliminating contamination of fresh water aquifers by saline water.

9 Claims, 2 Drawing Figures

WITNESSES

INVENTORS
P.A. ARGABRIGHT
J.L. HUMMEL
C.T. PRESLEY

BY

ATTORNEY

INHIBITION OF SALINE WATER INTRUSION INTO FRESH WATER AQUIFERS

CROSS REFERENCES TO RELATED APPLICATIONS

U.S. Pat. application Ser. No. 874,169, filed Nov. 5, 1969 (now U.S. Pat. No. 3,587,737); and Ser. No. 57,827 filed July 23, 1970 represent different solutions to the problem solved by the present invention. The preferred precipitatable aqueous solutions used in the present invention are taught in copending U.S. Pat. applications, Ser. No. 89,883, filed Nov. 16, 1970; Ser. No. 72,388, filed Sept. 15, 1970; and Ser. No. 72,288 filed Sept. 15, 1970.

BACKGROUND OF THE INVENTION

1. Field of the Invention

The present invention relates to the field of petroleum recovery as classified in Class 166 of the U.S. Patent Office entitled, "Wells, particularly in subclasses; –285 ("Cementing, plugging or consolidating") –294 ("Cement or consolidating material is organic . . ."), –295 ("Organic material - resinous")." More specifically the invention relates to inhibiting salt water intrusion into fresh water aquifers.

2. Description of the Prior Art

Various processes have been utilized for plugging and sealing subterranean formations, including those of U.S. Pat No. 2,800,184 which temporarily plug oil-bearing strata with specific surface active materials, then permanently plug more permeable strata with cement or other permanent plugging agent, then remove the temporary plug and recovers oil; U.S. Pat. No. 2,889,883 which seals porous underground formations with aromatic polyisocyanates or urethane derivatives, a specific catalytic phenol and an organic solvent which form an infusible resin in from 20 minutes to about 24 hours; U.S. Pat. No. 3,199,590 which consolidates incompetent sands with curable consolidating fluids, e.g., furfuryl alcohol and derived resins, then introducing an oil-overflush solution immiscible with the consolidating fluid and containing a quantity of catalysts for curing the consolidating fluid in the formation; U.S. Pat. No. 3,116,264 which teaches cementing compositions of water, hydraulic cement and maleic anhydride-vinyl nitrogen-containing ring compound copolymer as a slurry for cementing wells; U.S. Pat. No. 3,181,612 which utilizes a particularly dry water-soluble polyurethane polymer injected into the formation at fracturing pressure where it contacts intruding water which causes it to swell. Other plugging agents include thermo setting resins, gums, silica gel, etc. Less related is U.S. Pat. No. 2,899,330 which stabilizes soil with alkenyl polyamines. U.S. Pat. No. 3,380,522 teaches a method of stopping the advance of saline water into a fresh water aquifer by injecting into the aquifer a slurry containing granular materials such as reclaimed oil well drilling muds and sedimentary clays from the ocean floor. Such materials form an impenetrable bridging mass in the aquifer to block the intruding saline water.

SUMMARY OF THE INVENTION

General Statement of the Invention

None of the above prior art teaches methods for prevention of intrusion of salt water into fresh water aquifers by the use of compounds which automatically precipitate over a controlled period of time.

According to the present invention, special precipitatable aqueous solution is injected substantially between the fresh water aquifer and the salt water source, preferably into the front of the advancing salt water. These solutions precipitate at a rate which can be varied, e.g., by adjustment of the initial pH of the solution injected. These precipitates form a barrier to liquid flow between the fresh water aquifer and the salt water source. Utility of the Invention The present invention is useful in alleviating the intrusion of salt water into fresh water aquifers. Such fresh water aquifers are frequently valuable, e.g., for use in potable water supply or for use in petroleum recovery operations, e.g., conventional steam flooding. Nearby sources of salt water often intrude upon such fresh water aquifers, particularly when the effective fresh water table is lowered. Salt water sources may be the ocean itself in coastal areas or may be connate water contained within inland subterranean formations.

DESCRIPTION OF THE PREFERRED EMBODIMENTS

Starting Materials

Figure 1:
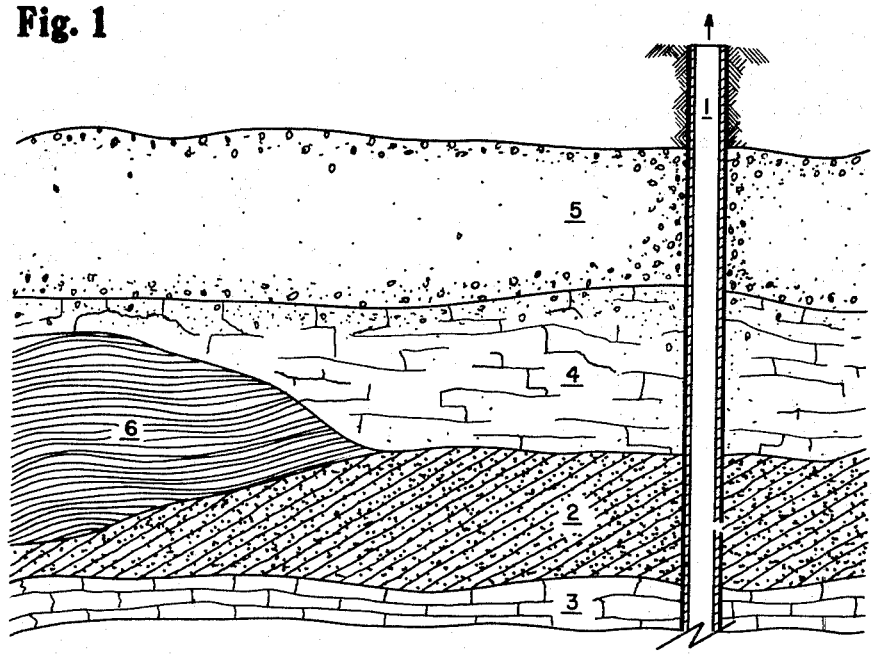
FIGS. 1 and 2 are schematic representations of the treatment of a subterranean formation according to the invention.
Figure 2:
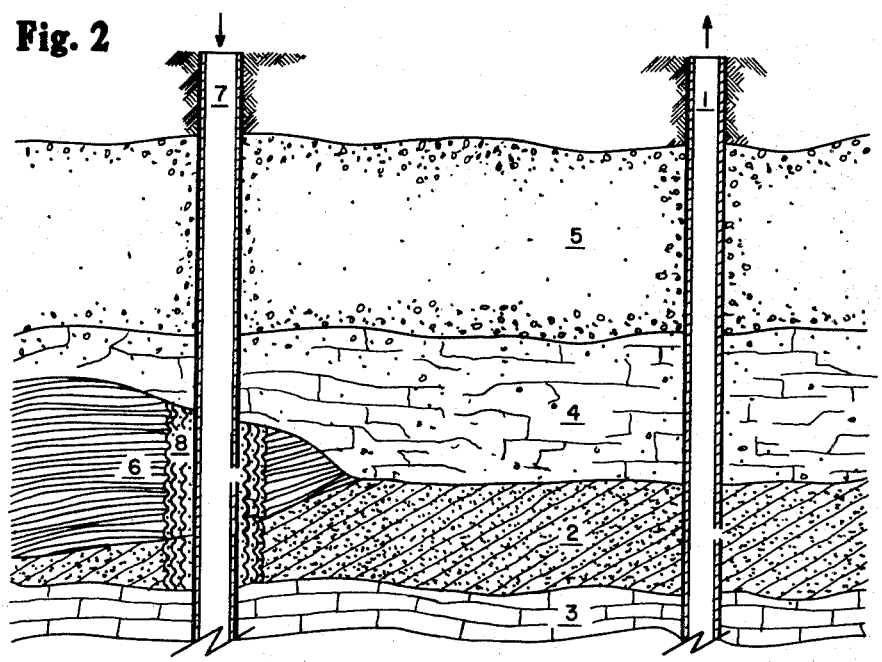

The plugging materials for use in the present invention are water-soluble materials, preferably compounds containing isocyanurate rings which gradually react to form precipitates, preferably aqueous solutions of compounds containing isocyanuric acid rings or their derivatives and most preferably polyisocyanurate compounds having the structure:

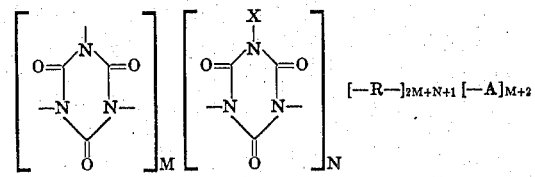

where
R = divalent radical
x = a metal (e.g., Na, K, Li) or hydrogen, quaternary ammonium, or a combination thereof
A = a monovalent group selected from the following: isocyanate, urethane (NHCO$_2$R'), urea, amino
R' = monovalent radical
M = average number of trisubstituted isocyanurate rings
N = average number of isocyanuric acid and/or isocyanurate salt groups
2M + N + 1 = average number of divalent R groups
M + 2 = average number of A groups
wherein R preferably contains two to 40, more preferably two to 30, and most preferably four to 18 carbon atoms; R' preferably contains one to 40, more preferably one to 20, and most preferably one to 10, and wherein there are no N-to-N bonds and no A-to-N bonds, and no A-to-A-bonds, and no R-to-R bonds.

Preferably the plugging agents will be present in the aqueous solutions in concentrations of about 0.01 to about 85, more preferably 0.10 to 50, and most preferably 0.25 to 25 weight percent. The viscosity of the aqueous solutions will be low enough to be injectable and will preferably be in the range of from about 0.1 to about 500, more preferably from about 0.25 to about 100, and most preferably from 0.50 to about 50 centipoises. While not necessary to the practice of the present invention, auxiliary agents, e.g., flocculating agents, corrosion inhibitors, scale inhibitors, bactercides, other salts, polyacrylamides, polyethylene glycols, or other polymers or other thickening agents for viscosity control, may be added to the aqueous solutions if desired for the particular application.

The preferred isocyanurate ring-containing compounds can be produced according to the methods of Canadian Pat. No. 831,994 granted Jan. 13, 1970 to Argabright, DePuy and Phillips. The most preferred polyisocyanuric acid derivatives having the structure drawn above can be prepared according to the techniques of West German application 1,816,521 which is a counterpart of copending U.S. Pat. application Ser. No. 715,199 filed Mar. 22, 1968, now U.S. Pat. No. 3,573,259.

The water used to form the aqueous solutions of the present invention can be fresh water or saline waters, e.g., water obtained from the Palestine water reservoir in Palestine, Illinois.

pH Control

In utilizing the preferred isocyanuric acids and derivatives, the precipitation occurs by a controlled hydrolysis of these compounds to form water-insoluble precipitates. The desired degree of plugging of the pores of the formation and the placement of the plugged zone within the desired portion of the reservoir, are accomplished by controlling the rate both of precipitation and amount of precipitate. This rate of hydrolysis is related to the pH of the solution at the time of injection. Having selected the rate of injection and the concentration, and knowing the temperature in the zone to be plugged, the optimum pH can be chosen by routine laboratory runs. In general, the higher the pH, the faster the hydrolysis and subsequent precipitation. In general, the pH will be in the range of from about 4 to about 15, more preferably from about 6 to 15, and most preferably from about 8 to about 15 with the exact pH of the injection being selected so as to cause precipitation at the rate desired under the particular circumstances. pH will generally be adjusted by the use of any common, inexpensive, and readily available suitable alkali, e.g., sodium hydroxide.

Formation Permeability

In general, the permeability of the formation before treatment will range from about 0.001 to about 30,000, more preferably from 0.5 to about 10,000, and most preferably from 0.2 to about 5,000 millidarcies. After treatment, the permeability may range from 0.0001 to about 25,000, more commonly 500 to about 0.01 millidarcies. In general, any formations having undesirably high permeability can be advantageously treated by the invention.

Placement Techniques

A wide variety of techniques, including those previously employed with conventional plugging agents, may be utilized to place the aqueous solutions of the present invention into the area between the salt water source and the fresh water aquifer. For example, a series of wells may be drilled so as to communicate with the edge of the salt water aquifer which is nearest to the fresh water aquifer. Sufficient quantities of materials of the present invention can then be injected into the wells to form a lateral barrier to flow of fluids from the salt water source toward the fresh water aquifer. In some cases, fracturing techniques can be used to speed the propagation of the fluids through the formation, provided that the fracture is controlled to occur in geological formations which will heal readily. The precipitation of the materials of this invention can, of course, impart assistance in healing relatively thin fractures.

EXAMPLES

EXAMPLE I

Preparation of Polyisocyanurate Salt

A 2,000 ml four-necked glass reactor equipped with a motor driven stirrer, reflux condenser, thermometer and adapter for introducing liquid is charged with 43.3 g of potassium cyanate (0.53 mole) and 1,000 ml of anhydrous dimethylformamide (DMF). To the resulting slurry at 75°C., 71 ml of tolylene diisocyanate (0.50 mole) is added dropwise at a rate of 0.428 ml/min. by means of a motor-driven syringe pump. After the addition was complete, the mixture was allowed to react an additional 10 min., cooled to 60°C., 100 ml of methanol added and the temperature permitted to drop to 23°C. The desired product was collected by filtration of the crude reaction mixture, extracted with acetone in a Soxhlet apparatus and dried to give 130.4 g of a pale yellow powder.

The product is water-soluble but relatively insoluble in hydrocarbon solvents.

The ratio of aromatic rings to end groups -

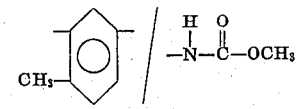

is measured by nuclear magnetic resonance (N.M.R.) (in $D_2O$) to be 12.8. This corresponds to a minimum average molecular weight of 6,500.

EXAMPLE II – III

Reduction in Permeability of Sandstone

A sample of fired Berea sandstone having a cylindrical shape 3 inches in diameter and 2 feet in length is chosen as a model porous medium. Two different pressure taps are installed in the core, pressure tap A is installed near the entrance end and pressure tap B is located near the mid-point. The initial permeability to the flow of 1.8 percent NaCl solution is determined as the average of the permeability values obtained at selected flow rates. An initial permeability of 144 millidarcies (md) was measured at pressure tap A, whereas B indicated a permeability of 119 md.

At this point a 3 percent aqueous solution of the compounds prepared in Example I, in 1 M NaOH is injected into the core, displacing the NaCl solution. The total amount of this aqueous solution injected is approximately 1.2 pore volumes. This fluid is then allowed to remain in the core for roughly 40 hours. After this time the permeability of the core is redetermined with 1.8 percent NaCl solution. The experimental results were as follows:

| Ex. | $K_{initial}$, md | $K_{final}$, md | $K_{final}/K_{initial}$ | Pressure Tap |
|-----|-------------------|-----------------|-------------------------|--------------|
| II  | 144               | 1.6             | 0.011                   | A            |
| III | 119               | 1.2             | 0.010                   | B            |

EXAMPLE IV – VI

Reduction in Permeability of More Permeable Sandstone.

In this example, the porous media is again a fired 2 feet × 3 inches diameter Berea sandstone. However, it is chosen to have a higher permeability than the material used in Example II. In this experiment, three different pressure taps are placed in the core sample. Pressure tap A is positioned near the inlet, pressure tap B is positioned at the mid-point and pressure tap C is positioned near the outlet end. The permeabilities are again determined and various flow rates using 1.8 percent NaCl solution. Again, 1.2 pore volumes of a 3 percent solution of the compound prepared in Example I in 1 M NaOH is injected into the core. This aqueous solution remains in the core for approximately 65 hours. Permeabilities are then redetermined with 1.8 percent NaCl solution. The experimental results were as follows:

| Ex. | $K_{initial}$, md | $K_{final}$, md | $K_{final}/K_{initial}$ | Pressure Tap |
|-----|-------------------|-----------------|-------------------------|--------------|
| IV  | 712               | 2.6             | 0.0036                  | A            |
| V   | 689               | 2.5             | 0.0037                  | B            |
| VI  | 587               | 2.1             | 0.0036                  | C            |

EXAMPLE VII

Referring to FIG. 1, production well 1 draws fresh water from fresh water aquifer 2 located between substantially impermeable zones 3 and 4, all of which lie below overburden zone 5. As the water is withdrawn from fresh water aquifer 2 there is a tendency for salt water bank 6 to intrude into zone 2, threatening to contaminate the fresh water being withdrawn from well 1. To alleviate this condition, there is drilled a second well 7 which communicates with zone 6. Through well 7, there is injected a solution of the composition produced according to claim 1 which has been adjusted to be approximately 1.0 molar in sodium hydroxide, so that precipitation occurs gradually over a period of approximately one to two days, allowing ample time for injection of a sufficient quantity to form a plug 8, within zone 6 lying within salt water bank 6 between the salt water source and production well 1.

After the solution in zone 8 has precipitated, zone 8 is rendered substantially impermeable to water flow and therefore forms a seal abutting impermeable zones 4 and 3 and preventing flow of salt water from bank 6 into that portion of formation 2 with which production well 1 communicates. Fresh water can then be withdrawn from production well 1 uncontaminated with salt water from bank 6.

Modifications of the Invention

It should be understood that the invention is capable of a variety of modifications and variations which will be made apparent to those skilled in the art by a reading of the specification. For example, the invention can be practiced in gas wells.

What is claimed is:

1. A method of inhibiting the advance of saline water into a fresh water aquifer comprising injecting into the subterranean formation between at least a portion of said saline water and at least a portion of said aquifer, an aqueous solution comprised of compounds which precipitate over a pH dependent time period to form a mass of precipitate within the formation, said precipitate forming a barrier which prevents advance of saline water into said aquifer, wherein the aqueous solution comprises an isocyanuric acid or its derivatives.

2. The process of claim 1 wherein the aqueous solution comprises isocyanurate derivatives having the structure;

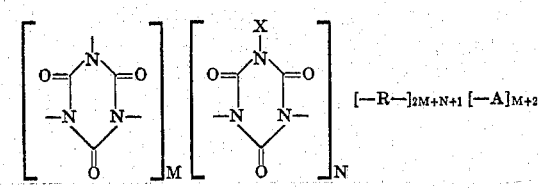

where
$R$ = divalent radical
$X$ = a metal (e.g., Na, K, Li), hydrogen, quaternary ammonium or a combination thereof,
$A$ = monovalent group selected from the following: isocyanate, urethane, urea, amino, $NH_2CO_2R'$,
$R'$ = monovalent radical
$M$ = average number of trisubstituted isocyanurate rings
$N$ = average number of isocyanuric acid or derivative rings
$2M + N + 1$ = average number of divalent $R$ groups
$M + 2$ = average number of A groups.

3. The process of claim 1 wherein the source of said saline water is located above said fresh water aquifer.

4. The process of claim 1 wherein the aqueous solution has a pH in the range of from about 8 to about 15.

5. In a process for preventing the advance of saline waters into a fresh water aquifer, the improvement comprising injecting between at least a portion of said aquifer and at least a portion of said saline water an aqueous solution of compounds which precipitate over a pH dependent time period to form a mass of solid precipitate which blocks intrusion of saline water into said aquifer, and adjusting the pH of said aqueous solution to control the time of said precipitation.

6. The process of claim 5 wherein the aqueous solution comprises an isocyanuric acid or its derivatives.

7. The process of claim 5 wherein the aqueous solution comprises isocyanurate derivatives having the structure:

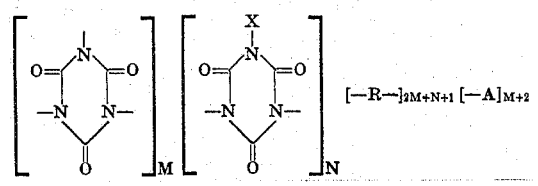

where $R$ = divalent radical
$X$ = a metal (e.g., Na, K, Li), hydrogen, quaternary ammonium, or a combination thereof,
$A$ = monovalent group selected from the following: isocyanate, urethane, urea, amino, $NH_2CO_2R'$
$R'$ = monovalent radical
$M$ = average number of trisubstituted isocyanurate rings
$N$ = average number of isocyanuric acid or derivative rings
$2M + N + 1$ = average number of divalent R groups
$M + 2$ = average number of A groups.

8. The process of claim 7 wherein the aqueous solution has a pH in the range of from about 8 to about 15.

9. A process for alleviating saline water invasion into fresh water aquifers, said process comprising injecting an aqueous solution of compounds which precipitate over a pH dependent time period at a controlled rate to form a relatively impermeable mass substantially insoluble in water, and adjusting the pH of said aqueous solution to control the time of said precipitation, said injection being so directed as to locate said mass in a position to block saline intrusion of said aquifer.

* * * * *